United States Patent [19]

Horlle et al.

[11] 3,865,882

[45] Feb. 11, 1975

[54] PROCESS FOR PREPARING GLYOXAL

[75] Inventors: Shigeki Horlle; Chiyuki Fujii, both of Kanagawa Pref.; Yoshio Kosai, Tokyo, all of Japan

[73] Assignee: Denki Kagaku Kogyo Kabushiki Kaisha, Tokyo, Japan

[22] Filed: May 8, 1970

[21] Appl. No.: 35,944

[30] Foreign Application Priority Data
May 9, 1969  Japan.............................. 44-35308

[52] U.S. Cl............................................. 260/601 R
[51] Int. Cl.............................................. C07c 47/12
[58] Field of Search ................................ 260/601 R

[56] References Cited
UNITED STATES PATENTS
3,387,039   6/1968   Doss .............................. 260/601 H Primary Examiner—Leon Zitver
Assistant Examiner—R. H. Liles
Attorney, Agent, or Firm—Sughrue, Rothwell, Mion, Zinn & Macpeak

[57] ABSTRACT

A process for preparing glyoxal which comprises reacting chloroacetaldehyde with a dialkyl sulfoxide. The preferred reaction temperature ranges from 50° to 200°C, and the use of chloroacetaldehyde as a 10–80% aqueous solution gives an increased yield of glyoxal. Neutralization of hydrochloric acid occurring as by-product can be made at the same time as the reaction by adding a weak acid salt or oxide of an alkaline earth metal to the reaction mixture, and results in an increased yield of glyoxal.

24 Claims, No Drawings

PROCESS FOR PREPARING GLYOXAL

BACKGROUND OF THE INVENTION

1. Field of the Invention

This invention relates to a process for preparing glyoxal from chloroacetaldehyde which is a novel starting material.

2. Description of the Prior Art

Heretofore, glyoxal [$(CHO)_2$] has been produced by oxidizing ethylene glycol or acetaldehyde. The process of the present invention involves the use of these materials, but employs chloroacetaldehyde as a novel material.

SUMMARY OF THE INVENTION

It has now been found that glyoxal can be prepared by reacting chloroacetaldehyde with a dialkyl sulfoxide in accordance with the following reaction scheme, thereby causing a dehalogenation-oxidation of chloroacetaldehyde:

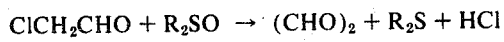

$$ClCH_2CHO + R_2SO \rightarrow (CHO)_2 + R_2S + HCl$$

DETAILED DESCRIPTION OF THE INVENTION

The starting chloroacetaldehyde is obtained as a by-product in the Hoechst-Wacker process for the production of acetaldehyde from ethylene. Chloroacetaldehyde has hitherto been completely discarded by burning it away because it has not found any significant utilization. The ability to produce useful glyoxal from this unutilized source by the process of the invention is of great commercial significance.

The liquid phase reaction indicated by the above equation proceeds to some extent even at room temperature. At a temperature of about 20°C, a condensation side-reaction occurs before the reaction proceeds, and results in a low yield of glyoxal. But, if the reaction temperature is maintained at 50°C or above, such a side-reaction is comparatively minimized and the yield increased. Higher temperatures give better results, but the preferred upper limit is about 200°C.

THe dialkyl sulfoxides used as the dehalogenation-oxidation agent can have straight-chain or branch chain alkyl groups containing not more than 4 carbon atoms. The two alkyl groups can be the same or different. Examples of such dialkyl sulfoxides include dimethyl sulfoxide, diethyl sulfoxide, di-n-propyl sulfoxide, diisopropyl sulfoxide, diisobutyl sulfoxide, methyl ethyl sulfoxide, di-n-butyl sulfoxide, methyl isobutyl sulfoxide, and ethyl n-butyl sulfoxide. Higher dialkyl sulfoxides in which the alkyl groups have 5 or more carbon atoms are of no practical value since they tend to cause side-reactions.

The molar ratios of the chloroacetaldehyde and dialkyl sulfoxide used and effective for increasing the yield of glyoxal are such that the latter is used in an amount which is slightly more than an equimolar amount.

In the dehalogenation-oxidation reaction described above, a dialkyl sulfide and hydrochloric acid occur as by-products. The dialkyl sulfide can be converted into a dialkyl sulfoxide by oxidizing with an oxidizing agent, such as molecular oxygen, nitric acid, or hydrogen peroxide, in a known manner. Thus, it can be recycled for further use. The hydrochloric acid can be recovered as a metal chloride, but if desired, can be stripped by distillation to recover it.

The presence of water in the above-mentioned reaction system leads to an increased yield of glyoxal. It is preferred, therefore, to use a 10 to 80% aqueous solution of chloroacetaldehyde as the starting material. Concentrations above 80% tend to result in side-reactions such as condensation and polymerization, and concentrations below 10% are economically disadvantageous.

The foregoing description has been directed to a basic embodiment of the process which comprises reacting a mixed solution consisting of an aqueous 10 to 80% solution of chloroacetaldehyde and a dialkyl sulfoxide having alkyl groups with not more than 4 carbon atoms at a temperature between 50° and 200°C. It has been found in another embodiment that the yield of glyoxal increases over that obtained in the basic process by improving this basic process and carrying out the reaction by adding chloroacetaldehyde gradually to a dialkyl sulfoxide. In this improved process, it is desirable to heat the dialkyl sulfoxide at from 50° to 200°C, and the preferred rate of adding chloroacetaldehyde is such that chloroacetaldehyde is present in the dialkyl sulfoxide always at a concentration of 3 to 5% by weight. Amounts of the chloroacetaldehyde in excess of 5% by weight tend to induce side-reactions. The use of chloroacetaldehyde as a 10 to 80% aqueous solution gives rise to a further increase in the yield of glyoxal.

It has also been found that the yield of glyoxal increases over that obtained in the basic process embodiment when this improved process is modified, and the reaction is performed while adding a mixture of chloroacetaldehyde and a dialkyl sulfoxide gradually to an inert solvent. In this embodiment, it is desirable to heat the inert solvent at from 50° to 200°C, and the preferred rate of adding the mixture is such that the chloroacetaldehyde is present in the solvent-containing reaction liquor constantly at a concentration of 3 to 5% by weight. The yield of glyoxal further increases when the chloroacetaldehyde is used in the form of a 10–80% aqueous solution. Examples of suitable inert solvents used in this embodiment include aromatic hydrocarbons or alicyclic alkanes, such as benzene, toluene, xylene, and cyclohexane; alkanes, such as decane, dodecane, isooctane, and fluid paraffin; ethers, such as anisole and diisobutyl ether; fluorohydrocarbons, such as Daifloil, e.g., Daifloil No. 1 and No. 3 is a registered trademark for the low polymers of trifluorochloro ethylene, products of Daikin Kogyo Co., Ltd., Japan; and silicone oils such as Toshiba silicone TSF-451, which is a registered tradename for dimethyl or methyl phenyl polysiloxane, products of Tokyo Shibaura Denki Co., Ltd.

Furthermore, it has been found that the yield of glyoxal can be increased still further if, in the practice of the basic embodiment or improved embodiments described above, a weak acid salt or oxide of an alkaline earth metal is suspended in the reaction liquor, and the reaction is carried out with simultaneous neutralization of the hydrochloric acid formed during the reaction. Suitable examples of the weak acid salt or oxide of alkaline earth metals are the carbonates, the oxalates, the sulfites, the borates, the higher carboxylates, and the oxides of calcium, magnesium, strontium, and barium. It is preferred that the weak acid salt or oxide be used in an amount of at least 0.5 mol equivalent based on chloroacetaldehyde, preferably more than an equimolar amount.

The invention will now be described by the following illustrative examples along with the comparative ones.

COMPARATIVE EXAMPLE 1

Twenty (20) grams of a 70% aqueous solution of chloroacetaldehyde was dissolved in 100 ml of dimethyl sulfoxide, and the solution obtained was reacted for 6 hours at 20°C.

Conversion of the chloroacetaldehyde was measured using gas-chromatographic analysis, and found to be only 8%. The yield of glyoxal, as measured by the dianilino ethane method and dinitrophenyl hydrazone method, was only 3.5%. This indicates that at room temperature, the process of the present invention is not commercially feasible.

EXAMPLE 1

The same reaction as described in Comparative Example 1 was carried out at varying temperatures and for varying periods of time as indicated in Table 1. The results obtained are shown in Table 1.

TABLE 1

| Reaction Temperature (°C) | Reaction Time (minute) | Conversion of Chloroacetaldehyde (%) | Yield of Glyoxal (%) |
| --- | --- | --- | --- |
| 70 | 150 | 34.7 | 22.5 |
| 100 | 60 | 39.0 | 29.6 |
| 145 | 30 | 83.1 | 30.5 |
| 170 | 15 | 82.1 | 37.9 |

It is seen from the results shown above that the yield of glyoxal markedly increased at higher reaction temperatures.

EXAMPLE 2

Fifty (50) milliliters of dimethyl sulfoxide was heated to 110°C, and 20 g of a 70% aqueous solution of chloroacetaldehyde was added dropwise over a period of 1.5 hours to effect the reaction. It was found that the conversion of chloroacetaldehyde was 78.5%, and the yield of glyoxal, 74.3%.

EXAMPLE 3

The procedure set forth in Example 2 was repeated except that 70 ml of methylisobutyl sulfoxide was used instead of the dimethyl sulfoxide. The conversion of chloroacetaldehyde was found to be 73.5%, and the yield of glyoxal, 52.5%.

EXAMPLE 4

The procedure set forth in Example 2 was repeated except that the reaction temperature was changed to 150°C. It was found that the conversion of chloroacetaldehyde was 85.1%, and the yield of glyoxal, 79.5%.

COMPARATIVE EXAMPLE 2

The procedure set forth in Example 3 was repeated except that a 70% acetone solution of chloroacetaldehyde was used instead of the 70% aqueous solution of chloroacetaldehyde. The conversion of chloroacetaldehyde was 85.5%, but the yield of glyoxal was only 19.2%. This indicates that the absence of water leads to a marked decrease in the yield of glyoxal.

EXAMPLE 5

Two hundred (200) milliliters of toluene as the solvent was heated to 150°C in an autoclave, and, with stirring, a mixed solution consisting of 50 ml. of dimethyl sulfoxide and 25 ml of a 70% aqueous solution of chloroacetaldehyde was charged at a rate of 1 milliliter per minute to accomplish the reaction. Ten minutes after the end of the charge addition, the reaction product was cooled, and analyzed. It was found that the conversion of chloroacetaldehyde was 85.4%, and the yield of glyoxal, 74.5%.

The same procedure as above was repeated using various solvents as shown in Table 2. The results obtained are shown in Table 2.

TABLE 2

| Solvent | Conversion of Chloroacetaldehyde (%) | Yield of Glyoxal (%) |
| --- | --- | --- |
| Xylene | 86.5 | 76.5 |
| Daifloil No. 1 | 83.5 | 66.0 |
| Silicone TSF-451 | 84.5 | 62.1 |
| Anisole | 96.5 | 60.5 |
| Isooctane | 85.5 | 71.2 |

EXAMPLE 6

One hundred (100) milliliters of dimethyl sulfoxide or diethyl sulfoxide was mixed with 20 g of a 70% aqueous solution of chloroacetaldehyde, followed by addition of the respective additives as shown in Table 3. The mixture was reacted for 1 hour at 70°C. The conversion of chloroacetaldehyde and the yield of glyoxal in each run are shown in Table 3.

TABLE 3

| Additive | Conversion of Chloroacetaldehyde (%) | Yield of Glyoxal (%) |
| --- | --- | --- |
| Examples | | |
| $CaCO_3$ | 88.6 | 69.5 |
| MgO | 87.5 | 61.5 |
| $BaCO_3$ | 89.1 | 52.6 |
| $CaC_2O_4$ | 88.8 | 68.1 |
| $CaCO_3$* | 88.5 | 60.1 |
| $Ca(C_{18}H_{35}O_2)_2$ | 86.5 | 59.3 |
| $CaSO_3$ | 88.5 | 65.5 |
| Comparative Examples | | |
| None | 88.4 | 46.5 |
| None * | 86.5 | 42.5 |
| $K_2CO_3$ | 100.0 | 12.1 |
| $(NH_4)_2CO_3$ | 100.0 | 0 |
| $NaHCO_3$ | 96.7 | 28.3 |
| $CaSO_4$ | 87.9 | 44.5 |
| $Fe_2O_3$ | 84.5 | 33.5 |

*Diethyl sulfoxide used.

The results shown in Table 3 demonstrate that when weak acid salts or oxides of alkaline earth metals are used as the additives, the yield of glyoxal markedly increases as compared with the absence of such additives, but the addition of weak acid salts of alkalies, strong acid salts of alkaline earth metals, or oxides of elements other than alkaline earth metals results in a marked decrease in the yield of glyoxal as compared with the absence of such additives.

EXAMPLE 7

The procedure set forth in Example 5 was repeated except that no additive was used and diethyl sulfoxide was used instead of dimethyl sulfoxide. It was found that the conversion of chloroacetaldehyde was 86.5%, and the yield of glyoxal, 42.0%.

EXAMPLE 8

The procedure of Example 7 was repeated except that 10 g of precipitated calcium carbonate was suspended in the reaction liquor. The conversion of chloroacetaldehyde was found to be 91.5%, and the yield of glyoxal, 87.5%, showing a marked increase.

What is claimed is:

1. A process for preparing glyoxal which comprises in the presence of water reacting chloroacetaldehyde with a dialkyl sulfoxide, each of said alkyl groups, which may be the same or different, of said dialkyl sulfoxide having less than 5 carbon atoms, at a temperature of at least 20°C.

2. A process according to claim 1 wherein said dialkyl sulfoxide is selected from the group consisting of dimethyl sulfoxide, diethyl sulfoxide, di-n-propyl sulfoxide, diisopropyl sulfoxide, diisobutyl sulfoxide, methyl ethyl sulfoxide, di-n-butyl sulfoxide, methyl isobutyl sulfoxide, and ethyl n-butyl sulfoxide.

3. A process according to claim 1 wherein the reaction is carried out at a temperature of from 50° to 200°C.

4. A process according to claim 1, wherein a member selected from the group consisting of a weak acid salt of an alkaline earth metal wherein the weak acid salt is selected from the group consisting of carbonates, oxalates, sulfites, borates and $(C_{18}H_{35}O_2)_2$ and an oxide of an alkaline earth metal is suspended in the reaction mixture, said alkaline earth metal being selected from the group consisting of calcium, magnesium, strontium and barium.

5. A process according to claim 4, wherein the weak acid salt and the oxide are used in an amount of at least 0.5 mol equivalent based on the chloroacetaldehyde.

6. A process according to claim 1 wherein the chloroacetaldehyde is used in the form of an aqueous solution at a concentration of from 10 to 80% by weight.

7. A process according to claim 1 wherein the reaction is carried out by adding chloroacetaldehyde to the dialkyl sulfoxide.

8. A process according to claim 7 wherein said dialkyl sulfoxide is selected from the group consisting of dimethyl sulfoxide, diethyl sulfoxide, di-n-propyl sulfoxide, diisopropyl sulfoxide, diisobutyl sulfoxide, methyl ethyl sulfoxide, di-n-butyl sulfoxide, methyl isobutyl sulfoxide, and ethyl n-butyl sulfoxide.

9. A process according to claim 7 wherein the dialkyl sulfoxide is maintained at a temperature of from 50° to 200°C.

10. A process according to claim 7, wherein a member selected from the group consisting of a weak acid salt of an alkaline earth metal wherein the weak acid salt is selected from the group consisting of carbonates, oxalates, sulfites, borates and $(C_{18}H_{35}O_2)_2$ and an oxide of an alkaline earth metal is suspended in the reaction mixture, said alkaline earth metal being selected from the group consisting of calcium, magnesium, strontium and barium.

11. A process according to claim 10, wherein the weak acid salt and the oxide are used in an amount of at least 0.5 mol equivalent based on the chloroacetaldehyde.

12. A process according to claim 7 wherein the chloroacetaldehyde is added while maintaining the concentration of the chloroacetaldehyde in the dialkyl sulfoxide within the range of from 3 to 5% by weight.

13. A process according to claim 7 wherein the chloroacetaldehyde is used as an aqueous solution at a concentration of 10 to 80% by weight.

14. A process according to claim 1 wherein the process is conducted by adding a mixture of the chloroacetaldehyde and the dialkyl sulfoxide to an inert solvent.

15. A process according to claim 14 wherein said dialkyl sulfoxide is selected from the group consisting of dimethyl sulfoxide, diethyl sulfoxide, di-n-propyl sulfoxide, diisopropyl sulfoxide, diisobutyl sulfoxide, methyl ethyl sulfoxide, di-n-butyl sulfoxide, methyl isobutyl sulfoxide, and ethyl n-butyl sulfoxide.

16. A process according to claim 14 wherein the inert solvent is maintained at a temperature of from 50° to 200°C.

17. A process according to claim 14 wherein said inert solvent is selected from the group consisting of aromatic hydrocarbons, alicyclic hydrocarbons, paraffinic hydrocarbons, fluorohydrocarbons, silicone oils, and ethers.

18. A process according to claim 14, wherein a member selected from the group consisting of a weak acid salt of an alkaline earth metal wherein the weak acid salt is selected from the group consisting of carbonates, oxalates, sulfites, borates and $(C_{18}H_{35}O_2)_2$ and an oxide of an alkaline earth metal is suspended in the reaction mixture, said alkaline earth metal being selected from the group consisting of calcium, magnesium, strontium and barium.

19. A process according to claim 18, wherein the weak acid salt and the oxide are used in an amount of at least 0.5 mol equivalent based on the chloroacetaldehyde.

20. A process according to claim 14 wherein the mixture of chloroacetaldehyde and dialkyl sulfoxide is added while maintaining the concentration of the chloroacetaldehyde in the reaction mixture within the range of from 3 to 5% by weight.

21. A process according to claim 14 wherein the chloroacetaldehyde is used as an aqueous solution at a concentration of 10 to 80% by weight.

22. A process according to claim 1, wherein the reaction is carried out at a temperature of from 20° to 200°C.

23. A process according to claim 7, wherein the reaction is carried out at a temperature of from 20° to 200°C.

24. A process according to claim 14, wherein the reaction is carried out at a temperature of from 20° to 200°C.

* * * * *